United States Patent [19]

Umezu

[11] Patent Number: 4,889,415
[45] Date of Patent: Dec. 26, 1989

[54] LIGHT BEAM DEFLECTOR DEVICES

[75] Inventor: Nubuhiko Umezu, Chiba, Japan

[73] Assignee: Sony Corporation, Tokyo, Japan

[21] Appl. No.: 212,222

[22] Filed: Jun. 27, 1988

[30] Foreign Application Priority Data

Jul. 10, 1987 [JP] Japan .............................. 62-105316[U]

[51] Int. Cl.$^4$ ................................................ G02F 1/11
[52] U.S. Cl. ...................................... 350/358; 369/44;
369/119
[58] Field of Search .................. 350/358; 369/44, 100,
369/111, 109, 119

[56] References Cited

U.S. PATENT DOCUMENTS

| 3,397,605 | 8/1968 | Brueggemann | 350/358 |
| 3,435,228 | 3/1969 | Gordon | 350/358 |
| 4,426,134 | 1/1984 | Abramovitz et al. | 350/358 |
| 4,556,290 | 12/1985 | Roulot | 350/358 |

Primary Examiner—Eugene R. Laroche
Assistant Examiner—Nathan W. McCutcheon
Attorney, Agent, or Firm—Hill, Van Santen, Steadman, & Simpson

[57] ABSTRACT

A light beam deflection device comprises an acoustooptic element including a piezoelectric crystal base with a first flat surface and second and third flat surfaces each perpendicular to the first flat surface and opposite to each other and a transducer attached to the first flat surface of the piezoelectric crystal base and supplied with a deflection control signal, a first lens element having a first cylindrical surface forming a cylindrical lens and a first slanted flat surface opposite to the first cylindrical surface and disposed so that the first cylindrical surface faces the second flat surface of the piezoelectric crystal base, and a second lens element having a second cylindrical surface forming a cylindrical lens and a second slanted flat surface opposite to the second cylindrical surface and disposed so that the second cylindrical surface faces the third flat surface of the piezoelectric crystal base. A light beam passing through the first lens element, acoustooptic element and second lens element successively is deflected by the acoustoopic element in accordance with the deflection control signal.

7 Claims, 2 Drawing Sheets

LIGHT BEAM DEFLECTOR DEVICES

BACKGROUND OF THE INVENTION

1. Field of the Invention

This invention relates generally to light beam deflection devices, and more particularly, is directed to an improved light beam deflection device employing an acoustooptic element for deflecting a light beam incident upon the acoustooptic element.

2. Description of the Prior Art

There have been proposed so-called optical writable discs of several types, each of which is available for writing an information signal therein and reading an information signal therefrom by means of a light beam incident thereupon. The optical writable disc of one type is provided thereon with a plurality of wobbling pits which are recorded by a light beam for recording caused to impinge upon the optical writable disc in a process of production of the same. The wobbling pits are used for a tracking servocontrol of a light beam impinging upon the optical writable disc for recording thereon or reading therefrom an information signal after the process of production.

For recording the wobbling pits on the optical writable disc, it is required to deflect the light beam for recording at a predetermined angle in synchronism with each wobbling pit. In the case where an acoustooptic deflector is used for deflecting the light beam for recording, the light beam for recording must be caused to enter the acoustooptic deflector at a glancing angle which is defined in relation to a lattice plane in the acoustooptic deflector and satisfies the Bragg condition expressed with the equation: $2 \cdot d \cdot \sin\theta = n\lambda$, where d represents a spacing of lattice planes, $\lambda$ represents a wavelength of the light beam for recording incident upon the acoustooptic deflector, n represents an integer. (Such a glancing angle $\theta$ is called the Bragg angle.) Accordingly, when the acoustooptic deflector is so positioned that the light beam for recording enters the acoustooptic deflector along a straight optical path, the light beam for recording emanates from the acoustooptic deflector along another straight optical path which extends at an angle of $2 \cdot \theta$ with the straight path along which the light beam for recording enters the acoustooptic deflector.

FIG. 1 shows a situation of light beam deflection caused by the acoustooptic deflector in such a manner as described above. In FIG. 1, an acoustooptic element 20 which forms the acoustooptic deflector comprises a piezoelectric crystal base 20A made of rock crystal, tellurium dioxide (TeO$_2$) or the like and a transducer 20B attached to the piezoelectric crystal base 20A. The transducer 20B is connected to a signal input terminal 20C to which a signal Ss having a frequency of, for example, 200 to 300 MHz is to be supplied. When the signal Ss is supplied to the signal input terminal 20C, a diffraction grating 23 is substantially formed in the piezoelectric crystal base 20A by a supersonic wave arising in the same. Under a situation wherein the diffraction grating 23 is formed in the piezoelectric crystal base 20A, an incident light beam 21 directed to enter the piezoelectric crystal base 20A from an incident plane 20i thereof, which is perpendicular to each lattice plane of the diffraction grating 23, at an incident angle $\theta$ satisfying the Bragg condition, is deflected by the diffraction grating 23 formed in the piezoelectric crystal base 20A so as to emanate from an outgoing plane 20o of the piezoelectric crystal base 20A, which is also perpendicular to each lattice plane of the diffraction grating 23, as an outgoing light beam 22 directed to be at an angle of $2 \cdot \theta$ with the incident light beam 21.

As described above, in the case of the acoustooptic deflector composed of an acoustooptic element provided with a body member such as the piezoelectric crystal base 20A shown in FIG. 1, an incident light beam is required to be directed to enter the acoustooptic element from an incident plane thereof accurately at an incident angle satisfying the Bragg condition and, as a result of deflection, an outgoing light beam emanating from an outgoing plane of the acoustooptic element is directed to be at an angle corresponding to the double of the incident angle with the incident light beam. Consequently, it is very difficult to arrange properly and precisely the acoustooptic element and light beam paths of the incident and outgoing light beams.

Further, a transducer provided to the acoustooptic element, such as the transducer 20B shown in FIG. 1, is often restricted in size in view of designing so as to be almost equal in area to the cross section of the incident light beam at a diffraction grating in the acoustooptic element and therefore the outgoing light beam is subjected to astigmatism. This results in a disadvantage that the cross section of the outgoing light beam may be deformed to be elliptic, and in the case where the outgoing light beam having its cross section deformed to be elliptic is used for recording the wobbling pits on the optical writable disc, there is caused a problem that each of the wobbling pits cannot be provided with a proper shape.

OBJECTS AND SUMMARY OF THE INVENTION

Accordingly, it is an object of the present invention to provide a light beam deflection device employing an acoustooptic element for deflecting a light beam incident upon the acoustooptic element, which avoids the aforementioned problems and disadvantages encountered with the prior art.

Another object of the present invention is to provide a light beam deflection device employing an acoustooptic element for deflecting a light beam incident upon the acoustooptic element, in which the acoustooptic element and optical paths of light beams incident upon and emanating from the acoustooptic element can be easily disposed to be in a proper arrangement.

A further object of the present invention is to provide a light beam deflection device employing an acoustooptic element for deflecting a light beam incident upon the acoustooptic element, by which the light beam is deflected with reduced deformation in its cross section.

A still further object of the present invention is to provide a light beam deflection device employing an acoustooptic element for deflecting a light beam incident upon the acoustooptic element, which is suitable for use in a system for recording wobbling pits on an optical writable disc.

According to the present invention, there is provided a light beam deflection device comprising an acoustooptic element which includes a piezoelectric crystal base having a first flat surface and second and third flat surfaces each perpendicular to the first flat surface and opposite to each other and a transducer attached to the first flat surface of the piezoelectric crystal base and supplied with a deflection control signal, and is operative to deflect a light beam passing through the piezoelectric crystal base from the second flat surface to the third flat surface in a deflection plane substantially perpendicular to the first flat surface in response to the deflection control signal, a first lens element having a first cylindrical surface forming a cylindrical lens and a first slanted flat surface opposite to the first cylindrical surface and disposed so that the first cylindrical surface faces the second flat surface of the piezoelectric crystal base with a curvature thereof extending along a direction substantially perpendicular to the deflection plane and an optical path for the light beam incident upon the second flat surface of the piezoelectric crystal base passes through the first lens element from the first slanted flat surface to the first cylindrical surface, and a second lens element having a second cylindrical surface forming a cylindrical lens and a second slanted flat surface opposite to the second cylindrical surface and disposed so that the second cylindrical surface faces the third flat surface of the piezoelectric crystal base with a curvature thereof extending along the direction substantially perpendicular to the deflection plane and an optical path for the light beam emanating from the third flat surface of the piezoelectric crystal base passes through the second lens element from the second cylindrical surface to the second slanted flat surface.

In the light beam deflection device thus constituted in accordance with the present invention, the light beam which is to be deflected passes through the first lens element, the piezoelectric crystal base of the acoustooptic element and the second lens element successively. The light beam is refracted at the first slanted flat surface of the first lens element so as to include a specific component directed to enter the piezoelectric crystal base at an incident angle satisfying the Bragg condition after having passed through the first lens element and further focused in the direction perpendicular to the deflection plane by the cylindrical lens formed by the first cylindrical surface of the first lens element. Then, the specific component of the light beam, which is focused by the first lens element and enters the piezoelectric crystal base from the second flat surface thereof at the incident angle satisfying the Bragg condition, has its cross section of a relatively small size in the direction perpendicular to the deflection plane in the piezoelectric crystal base and is deflected in the deflection plane by means of a diffraction grating formed in the piezoelectric crystal base in accordance with the deflection control signal to emanate from the third flat surface of the piezoelectric crystal base and enter the second lens element. Further, the specific component of the light beam deflected in the piezoelectric crystal base and entering the second lens element is collimated by the cylindrical lens formed by the second cylindrical surface of the second lens element and then refracted by the second slanted flat surface of the second lens element to emanate from the second lens element.

With the first and second lens elements disposed to face each other with the piezoelectric crystal base of the acoustooptic element between and affecting the light beam as mentioned above, it is possible to arrange an incident optical path along which the light beam enters the first lens element and an outgoing optical path along which the specific component of the light beam emanates from the second lens element after deflected by the acoustooptic element to be parallel with each other, and therefore the piezoelectric crystal base of the acoustooptic element and the optical paths for the specific component of the light beam passing through the first lens element, the piezoelectric crystal base and the second lens element can be easily disposed to be in a proper arrangement.

Further, since the cross section of the specific component of the light beam is relatively small in size in the direction perpendicular to the deflection plane in the piezoelectric crystal base of the acoustooptic element, the specific component of the light beam is little affected by unevenness in refraction factor of the piezoelectric crystal base resulting from uneven temperature distribution in the piezoelectric crystal base and then deflected with reduced deformation in the cross section thereof.

The above and other objects, features and advantages of the present invention will become apparent from the following detailed description which is to be read in conjunction with the accompanying drawings.

DESCRIPTION OF THE PREFERRED EMBODIMENT

Figure 1:
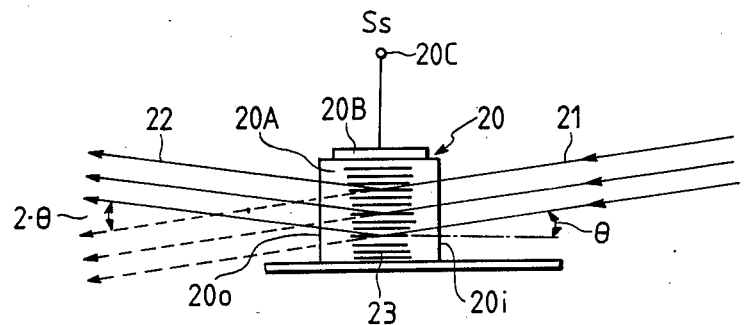
FIG. 1 is a schematic illustration showing a previously proposed acoustooptic deflector.
Figure 2:
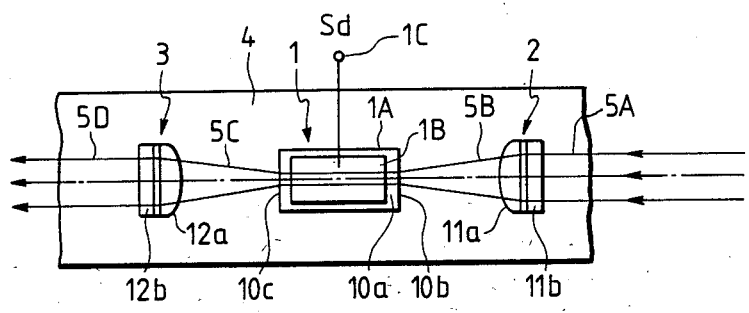
FIG. 2 is a schematic plan view showing one embodiment of light beam deflection device according to the present invention.
Figure 3:
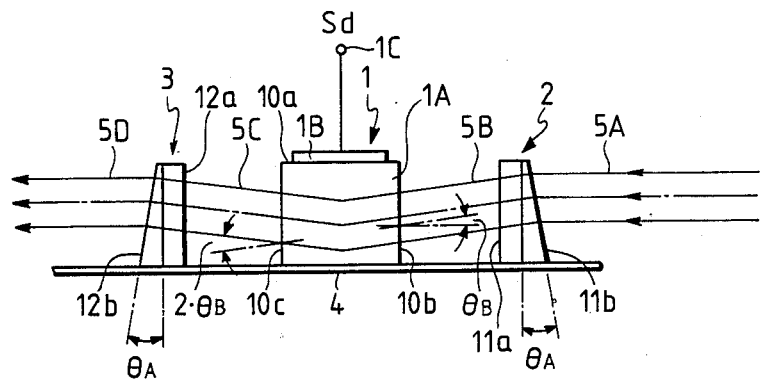
FIG. 3 is a schematic side view showing one embodiment of light beam deflection device according to the present invention.

FIGS. 2 and 3 show an embodiment of light beam deflection device according to the present invention.

The embodiment shown in FIGS. 2 and 3 comprises an acoustooptic element 1 which forms an acoustooptic deflector and includes a piezoelectric crystal base 1A made of rock crystal, tellurium dioxide (TeO$_2$) or the like and a transducer 1B attached to the piezoelectric crystal base 20A and connected to a signal input terminal 1C, and first and second lens elements 2 and 3 disposed to face each other with the acoustooptic element 1 between. The acoustooptic element 1, first lens element 2 and second lens element 3 are mounted in common on a supporting plate member 4 directly or through respective particular brackets (not shown in the drawings) as occasion demands.

The piezoelectric crystal base 1A of the acoustooptic element 1 has a first flat surface 10a and second and third flat surfaces 10b and 10c each perpendicular to the first flat surface 10a and opposite to each other. The transducer 1B is fixed on the first flat surface 10a of the piezoelectric crystal base 1A and supplied through the signal input terminal 1C with a deflection control signal Sd having a frequency of, for example, 200 to 300 MHz. When the deflection control signal Sd is supplied to the transducer 1B, a diffraction grating is substantially formed in the piezoelectric crystal base 1A by a supersonic wave arising in the same in accordance with frequency of the deflection control signal Sd. With such a diffraction grating formed substantially in the piezoelectric crystal base 1A, the acoustooptic element 1 is operative to deflect a light beam entering the piezoelectric crystal base 1A from the second flat surface 10b at an incident angle satisfying the Bragg condition in a deflection plane substantially perpendicular to the first flat surface 10a in response to the deflection control signal Sd.

The first lens element 2 has a cylindrical surface 11a forming a cylindrical lens and a slanted flat surface 11b opposite to the cylindrical surface 11a at an angle of inclination $\theta_A$ as shown in FIG. 3, and is positioned on the supporting plate member 4 so that the cylindrical surface 11a faces the second flat surface 10b of the piezoelectric crystal base 1A with a curvature thereof extending along a direction substantially perpendicular to the deflection plane in which the light beam passing through the piezoelectric crystal base 1A is deflected. In such an arrangement, an optical path for the light beam incident upon the second flat surface 10b of the piezoelectric crystal base 1A is set to pass through the first lens element 2 from the slanted flat surface 11b to the cylindrical surface 11a.

Further, the second lens element 3 has a cylindrical surface 12a forming a cylindrical lens and a slanted flat surface 12b opposite to the cylindrical surface 12a at an angle of inclination $\theta_A$ as shown in FIG. 3, and is positioned on the supporting plate member 4 so that the cylindrical surface 12a faces the third flat surface 10c of the piezoelectric crystal base 1A with a curvature thereof extending along the direction substantially perpendicular to the deflection plane in which the light beam passing through the piezoelectric crystal base 1A is deflected. In such an arrangement, an optical path for the light beam emanating from the third flat surface 10c of the piezoelectric crystal base 1A is set to pass through the second lens element 3 from the cylindrical surface 12a to the slanted flat surface 12b.

In the embodiment thus constituted, according to the present invention, a light beam 5A which is to be deflected is caused to enter the first lens element 2 from the slanted flat surface 11b thereof along an incident optical path set, for example, in parallel with the upper surface of the supporting plate member 4. In the first lens element 2, the light beam 5A is refracted at the slanted flat surface 11b and focused in the direction substantially perpendicular to the deflection plane by the cylindrical lens formed by the cylindrical surface 11a to emanate from the cylindrical surface 11a as a light beam 5B. The light beam 5B is directed to the piezoelectric crystal base 1A of the acoustooptic element 1. In this case, the angle of inclination $\theta_A$ of the slanted flat surface 11b provided on the first lens element 2 is so selected that the light beam 5B includes a specific component thereof which enters the piezoelectric crystal base 1A from the second flat surface 10b thereof at an incident angle $\theta_B$ satisfying the Bragg condition expressed with the equation: $2 \cdot d \cdot \sin\theta_B = n\lambda$, in relation to the piezoelectric crystal base 1A, as shown in FIG. 3.

The specific component of the light beam 5B, which is focused in the direction substantially perpendicular to the deflection plane and enters the piezoelectric crystal base 1A from the second flat surface 10b thereof at the incident angle $\theta_B$ satisfying the Bragg condition, has its cross section of a relatively small size in the direction perpendicular to the deflection plane in the piezoelectric crystal base 1A and is deflected in the deflection plane by means of the diffraction grating formed substantially in the piezoelectric crystal base 1A in accordance with the deflection control signal Sd which is supplied through the signal input terminal 1C to the transducer 1B so as to be a light beam 5C emanating from the third flat surface 10c of the piezoelectric crystal base 1A at an angle $2 \cdot \theta_B$ with the specific component of the light beam 5B. The light beam 5C which emanates from the piezoelectric crystal base 1A at the angle $2 \cdot \theta_B$ with the specific component of the light beam 5B enters the second lens element 3 from the cylindrical surface 12a thereof. In the second lens element 3, the light beam 5C is collimated by the cylindrical lens formed by the cylindrical surface 12a and then refracted by the slanted flat surface 12b to emanate from the slanted flat surface 12b as a light beam 5D. Since the slanted flat surface 12b of the second lens element 3 is selected to have the angle of inclination $\theta_A$, the light beam 5D is directed to go forward along an outgoing optical path set in parallel with the upper surface of the supporting plate member 4.

As described above, in the embodiment shown in FIGS. 2 and 3, the incident optical path along which the light beam enters the first lens element 2 and the outgoing optical path along which the light beam deflected by the acoustooptic element 1 emanates from the second lens element 3 are set in parallel with each other and therefore the piezoelectric crystal base 1A of the acoustooptic element 1, the first and second lens elements 2 and 3 and the optical paths for the light beams 5A to 5D can be easily disposed to be in a proper arrangement.

Further, since the cross section of the specific component of the light beam 5B is relatively small in size in the direction perpendicular to the deflection plane in the piezoelectric crystal base 1A of the acoustooptic element 1, the specific component of the light beam 5A is deflected in the piezoelectric crystal base 1A with reduced deformation in the cross section thereof, so that the light beam 5D emanating from the second lens element 3 has its cross section shaped appropriately.

Figure 4:
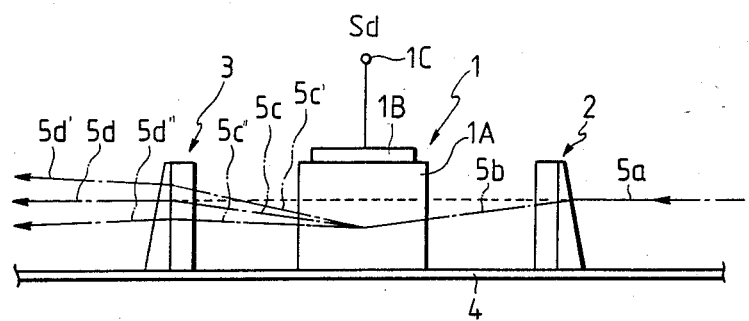
FIG. 4 is a schematic illustration used for explaining the operation of the embodiment shown in FIGS. 2 and 3.

When the frequency of the deflection control signal Sd is varied, the wavelength of the supersonic wave arising in the piezoelectric crystal base 1A of the acoustooptic element 1 in response to the deflection control signal Sd is changed so that the spacing d of lattice planes formed in the piezoelectric crystal base 1A is also changed. As a result, the value of the incident angle $\theta_B$ satisfying the Bragg condition is changed so that the substance of the specific component of the light beam 5B which enters the piezoelectric crystal base 1A from the second flat surface 10b at the incident angle $\theta_B$ is varied, and consequently the direction of the optical axis of each of the light beams 5C and 5D is changed in response to the frequency of the deflection control signal Sd, as shown in FIG. 4. In FIG. 4, 5a and 5b indicate optical axes of the light beams 5A and 5B, respectively, and 5c, 5c' and 5c" indicate variations of the optical axis of the light beam 5C caused in response to the change of the frequency of the deflection control signal Sd and accompanied with variations of the optical axis of the light beam 5D indicated by 5d, 5d' and 5d".

Figure 5:
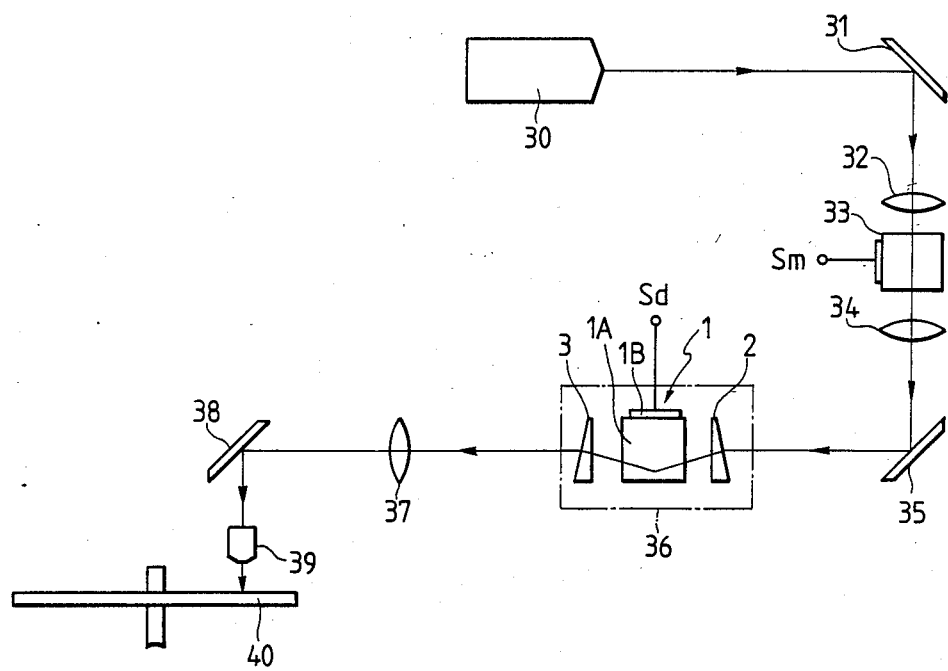
FIG. 5 is a schematic illustration showing one example of optical disc recording system to which the embodiment shown in FIGS. 2 and 3 is applied.

FIG. 5 shows schematically an optical disc recording system to which the embodiment shown in FIGS. 2 and 3 is applied. The optical disc recording system shown in FIG. 5 comprises a laser light source 30 for generating a laser light beam having a wavelength approximating to the wavelength of an ultraviolet ray, mirrors 31, 35 and 38, convex lenses 32, 34 and 37, an acoustooptic modulator 33 to which a modulating signal Sm is supplied, an objective lens 39 and a light beam deflection device 36 which is constituted by the embodiment shown in FIGS. 2 and 3, and is operative to cause the laser light beam emitted from the laser light source 30 to impinge upon an optical writable disc 40 for recording a plurality of wobbling pits on the optical writable disc 40.

In the system, the laser light beam emitted from the laser light source 30 is reflected by the mirror 31 to be directed through the convex lens 32 to the acoustooptic modulator 33. In the acoustooptic modulator 33, the laser light beam is modulated by the modulating signal Sm to have variations in intensity corresponding to the pits which are to be formed on the optical writable disc 40. The laser light beam modulated by the acoustooptic modulator 33 is guided through the convex lens 34 and the mirror 35 to the light beam deflection device 36 and deflected in the light beam deflection device 36 in accordance with the deflection control signal Sd supplied thereto. Then, the laser light beam having been subjected to the deflection by the light beam deflection is directed through the convex lens 37 and the mirror 38 to the objective lens 39 and focused on the optical writable disc 40 by the objective lens 39 so as to record each of the wobbling pits successively on the optical writable disc 40.

What is claimed is:

1. A light beam deflection device comprising:
   an acoustooptic element including a piezoelectric crystal base with a first flat surface and second and third flat surfaces each perpendicular to the first flat surface and opposite to each other and a transducer attached to the first flat surface of the piezoelectric crystal base and supplied with a deflection control signal, said acoustooptic element being operative to deflect a light beam passing through the piezoelectric crystal base from the second flat surface to the third flat surface in a deflection plane substantially perpendicular to the first flat surface in response to the deflection control signal,
   a first lens element having a first cylindrical surface forming a cylindrical lens and a first slanted flat surface opposite to the first cylindrical surface and disposed so that the first cylindrical surface faces the second flat surface of the piezoelectric crystal base with a curvature thereof extending along a direction substantially perpendicular to said deflection plane such that an optical path for a light beam incident upon the second flat surface of the piezoelectric crystal base passes through the first lens element from the first slanted flat surface to the first cylindrical surface, and
   a second lens element having a second cylindrical surface forming a cylindrical lens and a second slanted flat surface opposite to the second cylindrical surface and disposed so that the second cylindrical surface faces the third flat surface of the piezoelectric crystal base with a curvature thereof extending along the direction substantially perpendicular to said deflection plane such that an optical path for a light beam emanating from the third flat surface of the piezoelectric crystal base passes through the second lens element from the second cylindrical surface to the second slanted flat surface.

2. A light beam deflection device according to claim 1, wherein said first slanted flat surface of the first lens element is provided with an angle of inclination so selected that the light beam incident upon the second flat surface of the piezoelectric crystal base includes a specific component thereof which enters the piezoelectric crystal base from the second flat surface thereof at an incident angle satisfying the Bragg condition in relation to the piezoelectric crystal base.

3. A light beam deflection device according to claim 2, wherein said second slanted flat surface of the second lens element is provided with an angle of inclination so selected as to be substantially equal to the angle of inclination of said first flat surface of the first lens element.

4. A light beam deflection device according to claim 1, wherein said piezoelectric crystal base of the acoustooptic element, first lens element and second lens element are mounted in common on a supporting plate member.

5. A light beam deflection device according to claim 4, wherein an incident optical path along which a light beam enters said first lens element and an outgoing optical path along which a light beam emanates from said second lens element are provided substantially in parallel with a surface of said supporting plate member.

6. An optical disc recording system comprising:
   a light beam source for generating a light beam having a predetermined wavelength,
   an acoustooptic modulator for modulating in intensity the light beam from the light beam source in accordance with a modulating signal,
   a light beam deflection device for deflecting the light beam from the light beam source in accordance with a deflection control signal, said light beam deflection device comprising an acoustooptic element including a piezoelectric crystal base with a first flat surface and second and third flat surfaces each perpendicular to the first flat surface and opposite to each other and a transducer attached to the first flat surface of the piezoelectric crystal base and supplied with the deflection control signal, said acoustooptic element being operative to deflect the light beam from the light beam source passing through the piezoelectric crystal base from the second flat surface to the third flat surface in a deflection plane substantially perpendicular to the first flat surface in response to the deflection control signal, a first lens element having a first cylindrical surface forming a cylindrical lens and a first slanted flat surface opposite to the first cylindrical surface and disposed so that the first cylindrical surface faces the second flat surface of the piezoelectric crystal base with a curvature thereof extending along a direction substantially perpendicular to said deflection plane such that an optical path for the light beam from the light beam source incident upon the second flat surface of the piezoelectric crystal base passes through the first lens element from the first slanted flat surface to the first cylindrical surface, and a second lens element having a second cylindrical surface forming a cylindrical lens and a second slanted flat surface opposite to the second cylindrical surface and disposed so that the second cylindrical surface faces the third flat surface of the piezoelectric crystal base with a curvature thereof extending along the direction substantially perpendicular to said deflection plane such that an optical path for the light beam from the light beam source emanating from the third flat surface of the piezoelectric crystal base passes through the second lens element from the second cylindrical surface to the second slanted flat surface, and an objective lens for causing the light beam having been subjected to deflection by the light beam deflection device to impinge upon an optical disc.

7. An optical disc recording system according to claim 6, wherein said light beam deflection device is operative to deflect the light beam from the light beam source for recording a plurality of wobbling pits on the optical disc by the light beam impinging through the objective lens upon the optical disc.

* * * * *